Figure 1:
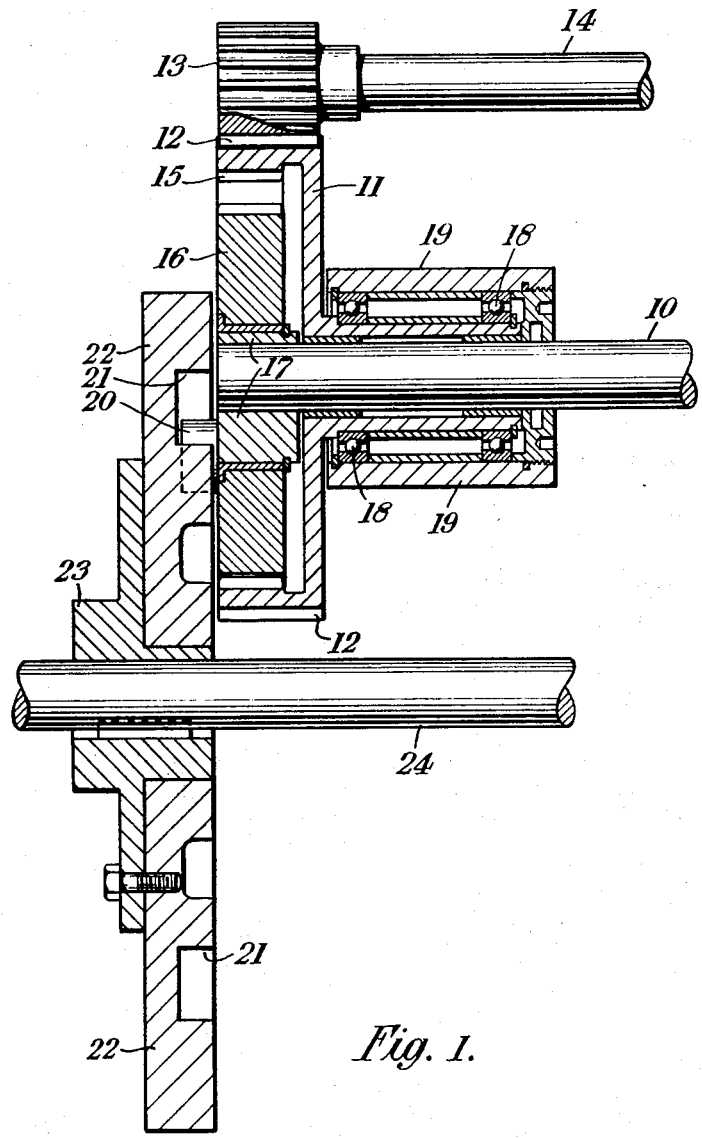

June 5, 1956   J. R. FOSTER ET AL   2,748,616
DRIVE MECHANISM FOR TEXTILE COMBING MACHINES
Filed March 4, 1953   5 Sheets-Sheet 1

June 5, 1956     J. R. FOSTER ET AL     2,748,616
DRIVE MECHANISM FOR TEXTILE COMBING MACHINES
Filed March 4, 1953     5 Sheets—Sheet 2

June 5, 1956 J. R. FOSTER ET AL 2,748,616
DRIVE MECHANISM FOR TEXTILE COMBING MACHINES
Filed March 4, 1953 5 Sheets-Sheet 4

June 5, 1956  J. R. FOSTER ET AL  2,748,616
DRIVE MECHANISM FOR TEXTILE COMBING MACHINES
Filed March 4, 1953  5 Sheets—Sheet 5

Inventors
John Raymond Foster
and Ronald Stuart Cartwright
By Moses, Nolte, Crews and Berry
Attorneys United States Patent Office 2,748,616
Patented June 5, 1956

2,748,616
DRIVE MECHANISM FOR TEXTILE COMBING MACHINES

John Raymond Foster, Accrington, and Ronald Stuart Cartwright, Oldham, England, assignors to T. M. M. (Research) Limited, Rossendale, England Application March 4, 1953, Serial No. 340,308

Claims priority, application Great Britain March 12, 1952

9 Claims. (Cl. 74—394)

The invention relates to improvements in textile combing machines of the type in which the detaching rollers are driven alternately in opposite directions of rotation, and has for its object to provide an improved drive by which the detaching rollers may either be turned through a given arc of revolution and then reversed through a smaller arc of revolution, or be held stationary for a period or periods as required for any particular cycle of operation. It is also an object of the invention to provide a simple compact driving mechanism capable of running at increased speed without imparting undue vibration to the machine framing or gears, and which will permit the ready adjustment of the lengths of the forward and reverse arcs of revolution of the detaching rollers, the speeds of the forward and reverse revolutions, and in the case in which it is required to hold the detaching rollers stationary, the periods during which said rollers are so held.

According to the invention, the driving mechanism for the detaching rollers of a textile combing machine comprises an input shaft, a gear train operatively associated with the detaching rollers and including an internally toothed annulus freely rotatable on the input shaft and a cooperating planet wheel freely rotatable on a bearing member fixed on, but eccentric to, the input shaft, so that on rotation of the input shaft the planet wheel rolls round the interior of the annulus and imparts a constant drive thereto, and means for periodically imparting a supplementary drive to the planet wheel independently of the motion of the input shaft to modify the speed and/or direction of rotation of the detaching rollers.

The means employed for periodically imparting a supplementary drive to the planet wheel, independently of the motion which it receives from the input shaft, may comprise an arrangement in which a cam-follower operatively associated with the planet wheel is influenced by a rotary cam-plate eccentrically mounted upon a subsidiary shaft which is driven to rotate continuously at the same speed as the comb cylinder shaft, the eccentric mounting of said cam-plate upon said subsidiary shaft being angularly adjustable in relation to the latter in such manner that the suppelmentary motion imparted by the cam-mechanism to the planet wheel may be varied with respect to its timed relationship with the rotation of the input shaft.

Alternatively, a compound planet wheel which may be geared also with a second annulus carrying a crank through which it receives a constant oscillatory motion from another source, in such fashion that the supplementary periodic drive thus imparted to said second annulus is effective to modify the speed and/or direction of motion imparted by the planet wheel to the first annulus.

In a further alternative construction, the means for periodically imparting a supplementary drive to the planet wheel comprise a member rotatably mounted on the input shaft and adapted to be rotated in relation thereto by means of a crank operatively connected with a subsidiary driving shaft, the rotational movement of the said member being transmitted to the planet wheel by means of an Oldham or other suitable type of coupling.

Still another feature of the invention resides in the provision of means by which one or more stationary periods in the cycle of operation of the detaching rollers is or are achieved.

Figure 2:
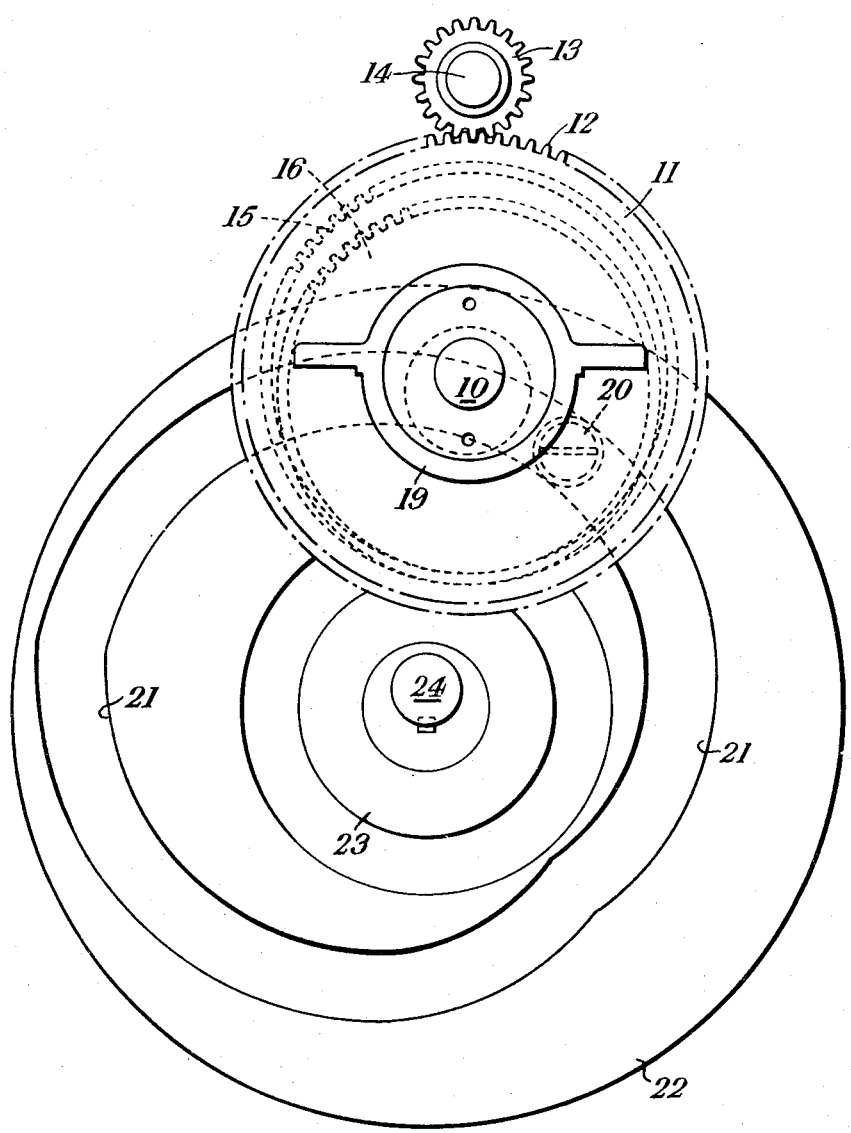
Figure 3:
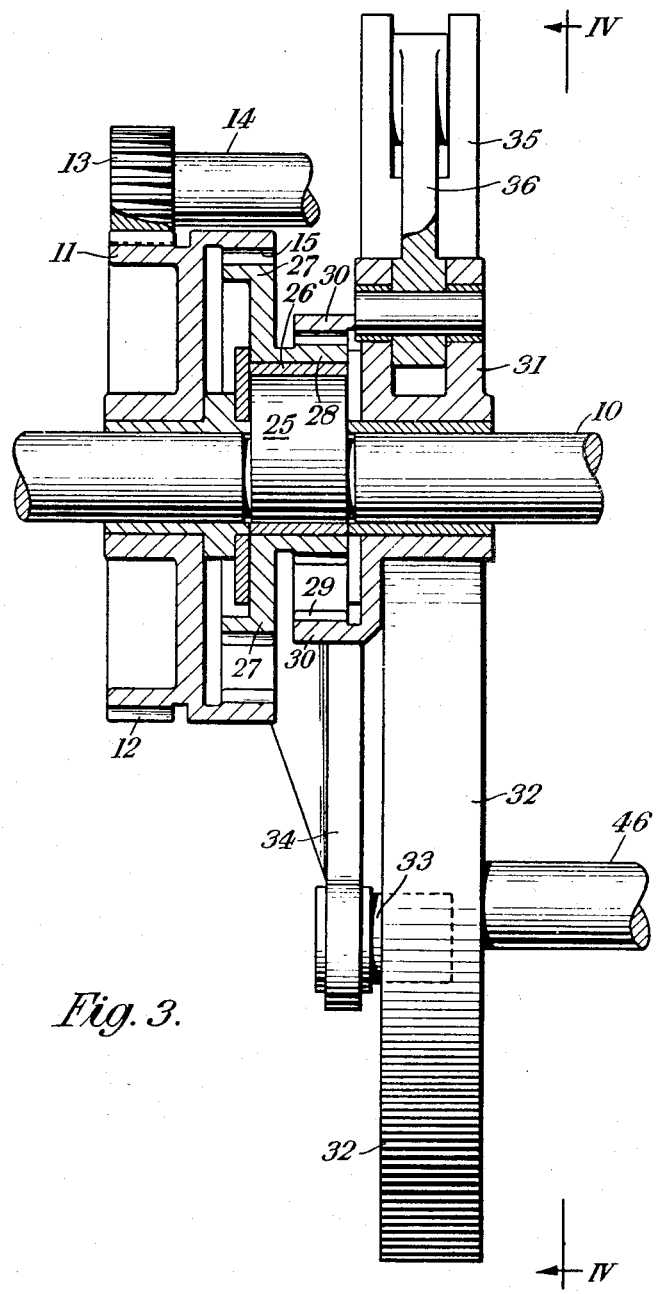
Figure 4:
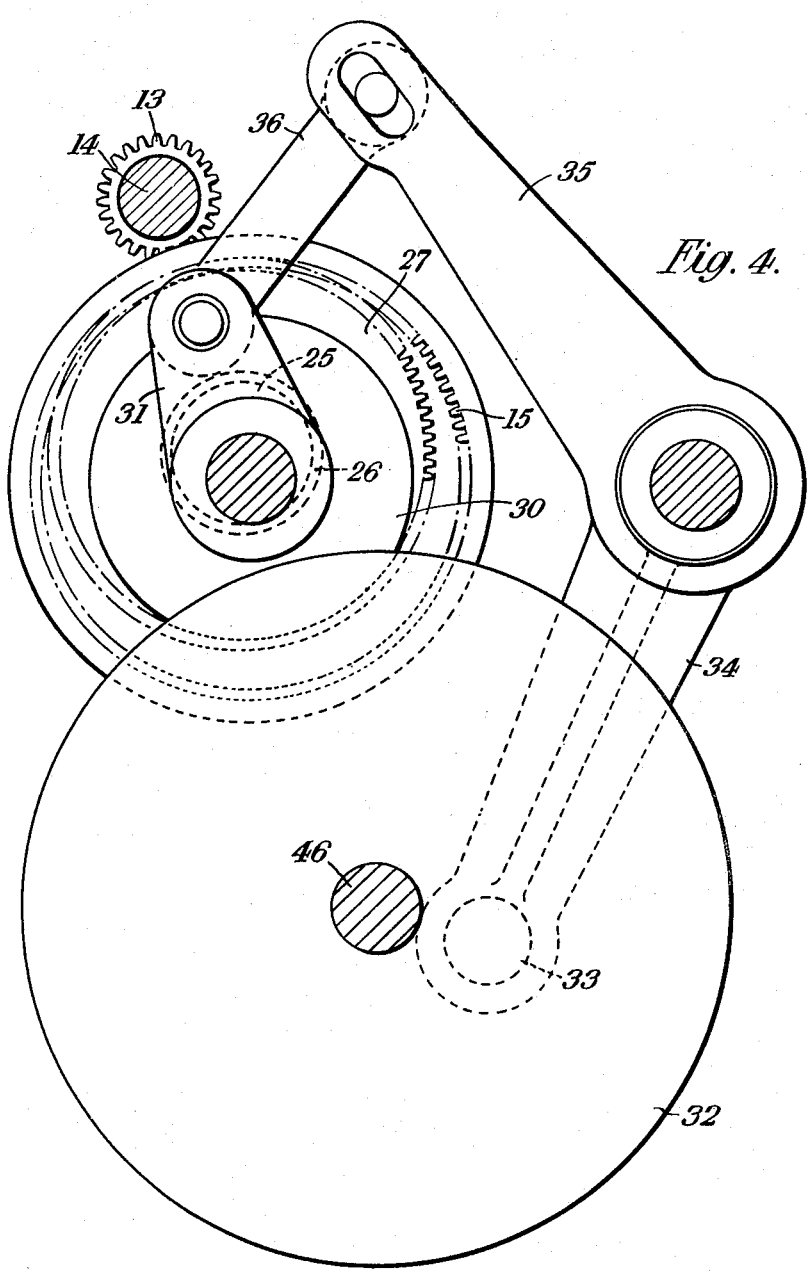
Figure 5:
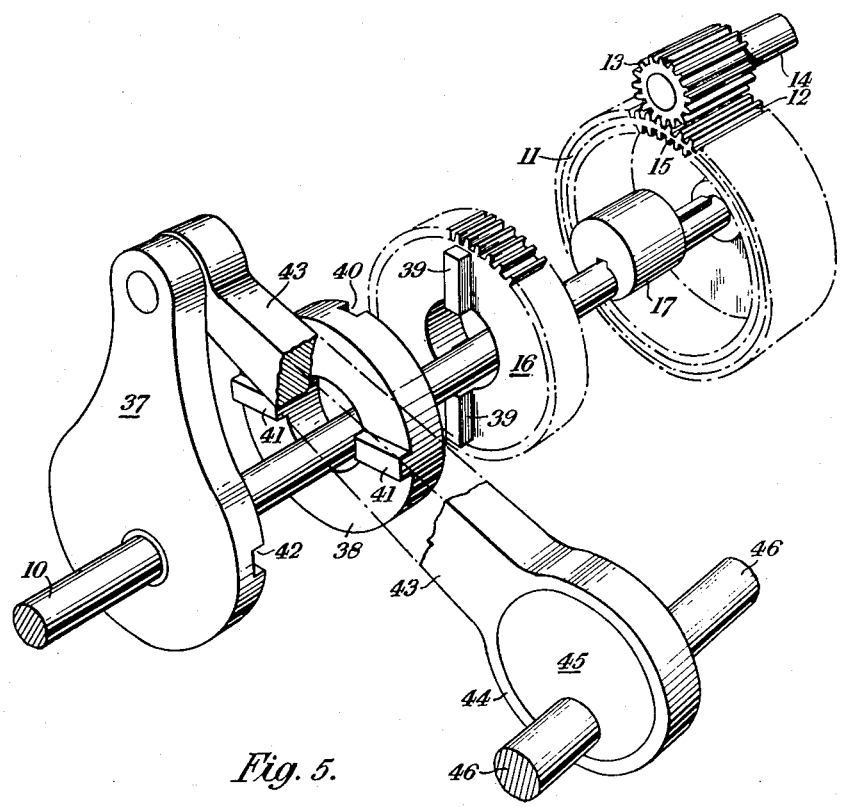
Figure 6:
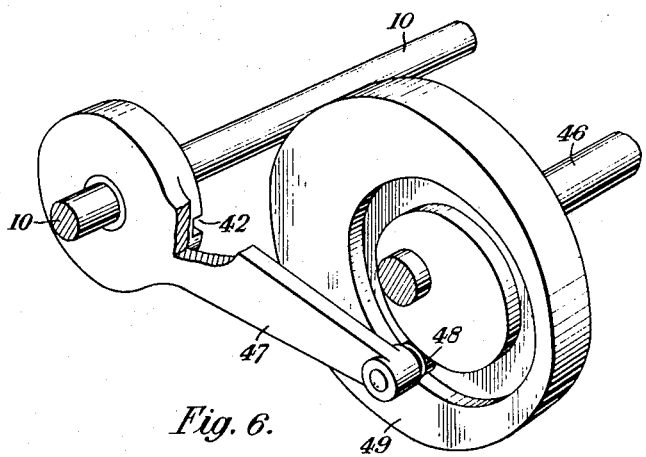

Various practical embodiments of the invention are hereinafter more fully described with reference to the accompanying diagrammatic drawings, in which Figs. 1 and 2 are respectively a section and an end elevation of a preferred embodiment; Figs. 3 and 4 illustrate a modification, showing respectively a longitudinal section and a section on the line IV—IV of Fig. 3; and Figs. 5 and 6 are respectively an "exploded" perspective view of another embodiment and a detail of a modification thereof.

The mechanism depicted in Figs. 1 and 2 comprises an input shaft 10 which is conveniently an integral extension of, or is coupled to, or is operated by and at the same speed as, the main comb cylinder shaft, which latter is driven at constant speed. Mounted freely upon said input shaft 10 is an annulus 11 having external teeth 12 which are in mesh with a pinion 13 on an output shaft 14 through which motion is transmitted to the detaching-rollers, and internal teeth 15 which mesh with a planet wheel 16 which is free to rotate upon an eccentric bush 17 fixed on the input shaft 10. The arrangement is such that rotation of the input shaft 10 causes the planet wheel 16 to roll around the inside of the annulus 11 and, through the external teeth 12 thereof, to impart a constant drive to the output shaft 14. The shaft 10 and the annulus 11 are together supported by ball-bearings 18 in a fixed bracket 19.

Projecting from the planet wheel 16, in a direction parallel to the rotary axis thereof, is a cam-follower constituted by a cylindrical stud 20. Said stud 20 is received in the cam track 21 of a cam-plate 22 which is in turn fixedly mounted upon an eccentric bush 23 fixed upon a subsidiary shaft 24 which is disposed parallel to the input shaft 10, and which is driven at the same speed at the input shaft 10, conveniently by suitable gearing connected with the same.

The constant rotary motion imparted to the cam-plate 22 by said subsidiary shaft 24 is effective, by reason of the cooperation of the cam-plate track 21 with the cam-follower 20 fixed to the planet wheel 16, to influence the resultant motion of the detaching rollers. The precise nature of the detaching roller motion is dependent upon the shape of the cam-track 21, and may, as will be understood, be determined so as to consist of a backward and forward rotation, with or without a dwell at any desired point in the cycle. The extent of backward and forward rotation imparted to the detaching rollers may conveniently be varied by suitable selection of the pinion 13 meshing with the external gear 12 of the annulus 11, and through which the motion of the latter is communicated to the detaching roller drive, a constant ratio between the distances moved backward and forward being maintained. The timing of the detaching period in relation to the other operations of the combing cycle may be varied by altering the fixed mounting of the cam-plate 22 on the eccentric bush 23 carrying the latter on the subsidiary shaft 24.

In the modification shown in Figs. 3 and 4, the input shaft 10 has an eccentric sheave 25 fixed thereon, and a strap 26 working on said sheave 25 carries a planet wheel constituted by a compound spurwheel 27, 28 the component 27 of which meshes with the internal teeth 15 of the annulus 11 (by which the detaching rollers are driven through the output shaft 14) whilst the component 28 meshes with the internal teeth 29 of a second annulus 30 also loosely mounted on the shaft 10. The annulus 30 is fixed to a crank 31 to which a constant oscillatory motion is applied by a cam-shaft 32 cooperating with a cam-follower 33 on a double-armed lever 34, 35 which is linked to said crank 31 by the member 36, and the arrangement is such that the supplementary periodic drive imparted to said annulus 30 is effective to modify the speed and/or the direction of motion of the annulus 11 through the compound spur-wheel 27, 28.

In the modification illustrated in Fig. 5, the motion of the planet wheel 16, which is driven through the eccentric boss 17 mounted on the input shaft 10, is modified by the periodic motion of a crank 37 through the medium of the Oldham coupling member 38 which is slidably coupled to the face of the planet wheel 16 by the dog and slot 39, 40 and to the face of said crank 37 by the dog and slot 41, 42. The crank is free to oscillate on the shaft 10 and is operated through the connecting-rod 43 by an eccentric 44, 45 of which the sheave 45 is fixed upon a lay-shaft 46 which may rotate at the same speed as the input shaft 10. The periodic motion thus imparted to the planet wheel 16 is effective alternately to accelerate the forward rotation of the detaching roller drive shaft 14 and to reverse the latter to turn the detaching rollers backward. A dwell in the cycle of operation of the detaching rollers may be obtained by substituting for the crank 37, the connecting-rod 43 and the eccentric 44, 45 the arrangement shown in Fig. 6 comprising a crank-arm 47 loosely mounted on the shaft 10 a cam-follower 48 at the extremity of said arm and a cam 49 fixed on the lay-shaft 46, said cam 49 cooperating with the cam-follower 48 to oscillate the crank-arm 47 which is slotted at 42 to cooperate with the dog 41 of the Oldham coupling member 38. The track of the cam 49 may be so designed that for a given portion of its cycle the rotation of the planet wheel 16 is arrested by the contrary motion imparted through the crank-arm 47, so that the detaching rollers are maintained stationary for a desired period.

What we claim as our invention and desire to secure by Letters Patent is:

1. In a textile combing machine of the type in which the detaching rollers are driven alternately in opposite directions of rotation, in combination, a detaching roller drive shaft, driving mechanism for the said detaching roller drive shaft comprising an input shaft mounted independently of the detaching roller drive shaft, a freely rotatable internally toothed annulus, gearing connecting said annulus to drive said detaching roller drive shaft, a bearing member fixed on but eccentric to the input shaft, a planet wheel freely rotatable on said eccentric bearing member, so that on rotation of the input shaft, the planet wheel rolls around the interior of the annulus, and cam means having a cam surface which is out of phase relationship with the said eccentric bearing member and engaged with said planet wheel to impart to the planet wheel a periodic oscillatory component of motion about its own axis, sufficient in magnitude to vary periodically the speed and direction of rotation of the detaching roller drive shaft.

2. A mechanism as claimed in claim 1, wherein the said cam means comprises a cam follower operatively associated with the planet wheel, a cam for influencing said follower, means causing the cam to be rotatably driven at the same speed as a comb cylinder shaft, and means for varying the phase relationship between the cam and the comb cylinder shaft.

3. Mechanism as claimed in claim 1, wherein a comb cylinder shaft is provided and the said cam means comprises an arrangement wherein a cam-follower operatively associated with the planet wheel is influenced by a cam rotating eccentrically at the same speed as the comb cylinder shaft, the eccentricity of said cam being adjustable to vary the timing of the motion imparted by the cam to the planet wheel in relation to the rotation of the input shaft.

4. Mechanism as claimed in claim 3, wherein the cam is eccentrically mounted on a subsidiary shaft driven at comb cylinder shaft speed, the eccentric mounting of the cam being angularly adjustable in relation to the subsidiary shaft.

5. In a textile combing machine, in combination, detaching rollers, driving mechanism for the detaching rollers, comprising an input shaft, a gear train operatively associated with the detaching rollers and including an internally toothed annulus freely rotatable on the input shaft and a cooperating planet wheel freely rotatable on a bearing member fixed on but eccentric to the input shaft, so that on rotation of the input shaft the planet wheel rolls round the interior of the annulus and imparts a constant drive thereto, and means for imparting a periodic supplementary drive to the planet wheel independently of the motion of the input shaft to modify the speed and/or direction of rotation of the detaching rollers, the planet wheel being additionally geared with a second annulus carrying a crank through which it receives a constant oscillatory motion from another source, the resultant periodic drive imparted to the second annulus being effective to modify the speed and/or direction of motion communicated by the planet wheel to the first annulus.

6. Mechanism as claimed in claim 5, wherein the planet wheel is constituted by a compound spur wheel the components of which are respectively in rolling meshed engagement with the first and second internally-toothed annuli.

7. Mechanism as claimed in claim 5, wherein the crank is linked to one arm of a double-armed lever, the other arm of which carries a cam-follower cooperatively associated with a cam fixed on a subsidiary shaft constantly rotated at comb cylinder shaft speed.

8. In a textile combing machine, in combination, detaching rollers, driving mechanism for the detaching rollers, comprising an input shaft, a gear train operatively associated with the detaching rollers and including an internally toothed annulus freely rotatable on the input shaft and a cooperating planet wheel freely rotatable on a bearing member fixed on but eccentric to the input shaft, so that on rotation of the input shaft the planet wheel rolls round the interior of the annulus and imparts a constant drive thereto, and means for imparting a periodic supplementary drive to the planet wheel independently of the motion of the input shaft to modify the speed and/or direction of rotation of the detaching rollers, the planet wheel being connected through an Oldham coupling with a crank which is freely oscillable on the comb cylinder shaft and to which periodic motion is imparted by an eccentric mounted on a lay-shaft rotated at input shaft speed.

9. In a textile combing machine, in combination, detaching rollers, driving mechanism for the detaching rollers, comprising an input shaft, a gear train operatively associated with the detaching rollers and including an internally toothed annulus freely rotatable on the input shaft and a cooperating planet wheel freely rotatable on a bearing member fixed on but eccentric to the input shaft, so that on rotation of the input shaft the planet wheel rolls round the interior of the annulus and imparts a constant drive there to, and means for imparting a periodic supplementary drive tn the planet wheel independently of the motion of the input shaft to modify the speed and/or direction of rotation of the detaching rollers, the planet wheels is connected through an Oldham coupling with a crank-arm which is freely oscillable on the input shaft and to which periodic motion is imparted, through the medium of a cam-follower carried by said crank-arm, by a cam mounted on a lay-shaft rotated at comb cylinder shaft speed.

References Cited in the file of this patent

UNITED STATES PATENTS

| | | |
|---|---|---|
| 724,663 | Clennam | Apr. 7, 1903 |
| 1,141,626 | Granville | June 1, 1915 |
| 1,190,407 | Helmbold et al. | July 11, 1916 |
| 1,232,717 | Rathman | July 10, 1917 |
| 1,658,767 | Hall | Feb. 7, 1928 |
| 1,915,797 | Nowka | June 27, 1933 |
| 2,168,164 | Kittredge | Aug. 1, 1937 |
| 2,535,774 | Armelin | Dec. 26, 1950 |